United States Patent [19]

Asayama

[11] Patent Number: 4,892,071
[45] Date of Patent: Jan. 9, 1990

[54] THROTTLE VALVE CONTROLLING APPARATUS EMPLOYING ELECTRICALLY CONTROLLED ACTUATOR

[75] Inventor: Yoshiaki Asayama, Hyogo, Japan

[73] Assignee: Mitsubishi Denki Kabushiki Kaisha, Tokyo, Japan

[21] Appl. No.: 222,972

[22] Filed: Jul. 22, 1988

[30] Foreign Application Priority Data

Jul. 22, 1987 [JP] Japan ............................. 62-184169
Sep. 11, 1987 [JP] Japan ............................. 62-229214

[51] Int. Cl.4 ................................................ F02D 9/08
[52] U.S. Cl. .................................... 123/336; 123/337; 123/396; 123/399; 123/400; 137/614.16
[58] Field of Search ............... 123/336, 337, 361, 396, 123/397, 399, 400, 403, 198 D; 137/614.16

[56] References Cited

U.S. PATENT DOCUMENTS

| | | | |
|---|---|---|---|
| 4,392,502 | 7/1983 | Weston | 123/342 |
| 4,424,785 | 1/1984 | Ishida et al. | 123/399 |
| 4,462,357 | 7/1984 | Lockhart | 123/336 |
| 4,526,060 | 7/1985 | Watanabe | 74/626 |
| 4,827,884 | 5/1989 | Cook | 123/336 |

FOREIGN PATENT DOCUMENTS

| | | | |
|---|---|---|---|
| 63-80026 | 4/1988 | Japan | 123/337 |
| 63-109248 | 5/1988 | Japan | 123/337 |
| 9694 | of 1914 | United Kingdom | 123/336 |

Primary Examiner—Andrew M. Dolinar
Attorney, Agent, or Firm—Sughrue, Mion, Zinn, Macpeak and Seas

[57] ABSTRACT

In a throttle valve controlling apparatus, there is provided a pair of first and second throttle valves. The first throttle valve is rotated by an electrically controlled actuator means, whereas the second throttle valve is rotated by an accelerator pedal. A first return spring is provided on the first throttle valve so as to return this valve to a first closed position when the electrically controlled actuator means is brought into malfunction, by which an engine speed is rapidly reduced. Under this malfunction condition, the second throttle valve can be independently controlled by the accelerator pedal.

9 Claims, 4 Drawing Sheets

FULLY CLOSED

FULLY OPENED

THROTTLE VALVE CONTROLLING APPARATUS EMPLOYING ELECTRICALLY CONTROLLED ACTUATOR

BACKGROUND OF THE INVENTION

1. Field of the Invention

The present invention generally relates to a control apparatus for a throttle valve of an automobile engine. More specifically, the invention is directed to a control apparatus for controlling a relative opening degree of a pair of throttle valves rotatably mounted.

2. Description of the Related Art

In recent years, as means for controlling the engine to improve the exhaust emission controlling performance and fuel consumption performance, there has been developed a throttle valve controlling apparatus using an electrically controlled actuator in which a throttle valve and an accelerating pedal are not mechanically coupled, but the opening and closing of the throttle valve are controlled based upon a control signal. This control signal is obtained by converting an accelerating pedal operating amount into an electric signal (this signal is referred to as "an accelerator pedal operating amount signal") and signals indicative of the other engine operating state or vehicle running state (for example, these signals include an engine revolution speed signal, a gear position signal, and the like).

The throttle valve is opened and closed by a throttle valve drive motor. This motor operates in accordance with a command which is input from a vehicle controlling apparatus consisting of a calculation/controlling unit to sequentially calculate the optimal opening degree in correspondence to the engine operating state or vehicle running state. Therefore, it is necessary to provide a fail-safe device to prevent the runaway of the vehicle even if the electrically controlled actuator including the drive motor is made inoperative during the running of the vehicle. As a conventional example having such a fail-safe device, there has been disclosed a specific construction in Japanese Patent Publication No. 58-25853 (1983). That is, an electromagnetic clutch is employed to disconnect a throttle valve shaft from the drive motor when the engine becomes uncontrollable, and a return spring to fully close the throttle valve when the electromagnetic clutch is in the inoperative mode, is attached to the throttle valve shaft. On the other hand, in Japanese Patent Disclosure (KOKAI) No. 61-215436, there has also been disclosed an apparatus in which the throttle valve shaft is mechanically rotated through a differential gear device in response to a control amount of the electrically controlled actuator or an operating amount of the accelerating pedal.

However, according to such conventional apparatuses, when the electrically controlled actuator is once made inoperative, there is another problem such that although the runaway of the vehicle can be prevented, the continuous driving of the vehicle cannot be maintained and the vehicle cannot be moved to a repair shop.

The present invention is made to solve such conventional problems and it is an object of the invention to provide a throttle valve controlling apparatus having the higher reliability, and the higher response characteristic.

Another object of the invention is to provide a throttle valve controlling apparatus of an engine which can be also utilized to a traction control such that the engine torque is reduced by decreasing an opening degree of a throttle valve when drive wheels slip at the start and acceleration of the vehicle, or to an apparatus such that an opening degree of the throttle valve is reduced upon gear change in order to prevent a shock which is caused in the gear changing operation of an automatic transmission.

SUMMARY OF THE INVENTION

These objects of the invention are accomplished by providing a throttle valve controlling apparatus (200) for an automobile comprising:

throttle valve means including a first throttle valve (4) and a second throttle valve (2) relatively rotatable to said first throttle valve (4), for controlling a flow of an air/fuel mixture to an engine;

rotating means (7;8) mechanically coupled to an accelerator pedal (9), for relatively rotating said first throttle valve (4) with respect to said second throttle valve (2);

first return spring means (10) for biasing said first throttle valve (4) so as to set the same (4) to a first closed position of said throttle valve means when said accelerator pedal (9) is released;

relative rotation angle sensor means (17) for detecting an actual relative rotation angle between said first and second throttle valves (4;2) to output an actual relative rotation angle signal;

calculation controlling means (21) for producing a rotation command signal representative of a target relative rotation angle ($\theta_T$) for said first and second throttle valves (4;2), determined by operation of said accelerator pedal (9);

electrically controlled actuator means (13) for relatively rotating said second throttle valve (2) with respect to said first throttle valve (4) in response to said rotation command signal derived from said calculation controlling means (21) in such a manner that deviation between said target relative rotation angle and actual relative rotation angle becomes zero;

rotation angle sensor means (18) coupled to said second throttle valve (2), for detecting a rotation angle of said second throttle valve (2) to output a rotation angle signal to said calculation controlling means (21); and, second return spring means (16) for biasing said second throttle valve (2) so as to set the same (2) to a second closed position of said throttle valve means, whereby when said electrically controlled actuator means (13) is brought into malfunction by checking said rotation angle signal from said rotation angle means (18), said second throttle valve (2) is set to said second closed position at which engine speed is rapidly reduced, and said first throttle valve (4) is independently rotatable by said accelerator pedal (9).

Also, a throttle valve controlling apparatus (400) for an automobile according to the invention comprising:

throttle valve means including a first throttle valve (2) and a second throttle valve (4) relatively rotatable to said first throttle valve (2), for controlling a flow of an air/fuel mixture to an engine;

rotating means (7;8) mechanically coupled to an accelerator pedal (9), for relatively rotating said first throttle valve (4) with respect to said second throttle valve (2);

first return spring means (10) for biasing said first throttle valve (4) so as to set the same (4) to a first closed position of said throttle valve means when said accelerator pedal (9) is released;

relative rotation angle sensor means (17) for detecting an actual relative rotation angle between said first and second throttle signal valves (4;2) to output an actual relative rotation angle;

rotation angle sensor means (170) coupled to said second throttle valve (2), for detecting a rotation angle of said second throttle valve (2) to produce a rotation angle signal;

engine condition/drive condition sensor means (20), for detecting conditions of the engine and also the automobile's drive to produce an engine condition detecting signal and a drive condition detecting signal;

calculation controlling means (21) for producing a rotation command signal representative of a target relative rotation angle ($\theta_R$) for said first and second throttle valves (4;2), determined by said engine condition detecting signal and said drive condition detecting signal and also operation of the accelerator pedal (9);

electrically controlled actuator means (13) for relatively rotating said second throttle valve (2) with respect to said first throttle valve (4) in response to said rotation command signal derived from said calculation controlling means (21) in such a manner that deviation between said target relative rotation angle and actual relative rotation angle becomes zero, and for relatively rotating said second throttle valve (2) with respect to said first throttle valve (4) in response to said engine condition detecting signal and drive condition detecting signal so as to reduce said actual relative rotation angle by which engine speed is reduced; and, second return spring means (220;230) for biasing said second throttle valve (2) so as to set the same (2) to a second closed position of said throttle valve means, whereby when said electrically controlled actuator means (13) is brought into malfunction by checking said rotation angle signal from said rotation angle sensor means (170), said second throttle valve (2) is set to said second closed position at which the engine speed is rapidly reduced, and said first throttle valve (4) is independently rotatable by said accelerator pedal (9).

BRIEF DESCRIPTION OF THE DRAWINGS

For a better understanding of the invention, reference is made to read the following detailed description in conjunction with the accompanying drawings, in which.

DETAILED DESCRIPTION OF THE PREFERRED EMBODIMENTS BASIC IDEAS

Before proceeding with various preferred embodiments according to the invention, basic ideas of the invention will now be described.

In a first throttle valve controlling apparatus of an engine realized based on a first basic idea of the invention, a pair of first and second throttle valves are employed. The first throttle valve is rotated by transferring a rotational force of a throttle valve drive motor thereto through an electromagnetic clutch, and the second throttle valve is rotated through an accelerator wire by depressing an accelerating pedal. When an electrically controlled actuator including the drive motor is brought into malfunction, the first throttle valve is fully closed (that is, the engine speed is rapidly reduced) and thereafter, the second throttle valve can be continuously controlled by operating the accelerator pedal, so that the driving of the vehicle can be continued in a so-called "limp form".

On the other hand, according to a second throttle valve controlling apparatus of an engine realized based on a second basic idea of the invention, a pair of first and second throttle valves are similarly provided. In a normal driving mode, either one of the first and second throttle valves (e.g., the first throttle valve) is directly rotated by the accelerator pedal through driving means, so that this first throttle valve can promptly rotate in response to the rapid motion of the accelerator pedal. During the traction control or gear change of the automatic transmission, the opening degree of the throttle valve is required to be reduced contrary to the accelerating operation of the accelerator pedal. At this time, the electrically controlled actuator is made operative to drive the other one, i.e., the second throttle valve and controls this second throttle valve based upon a target throttle valve opening degree calculated by a calculation controlling unit. While the electrically controlled actuator fails, this throttle valve is returned to the set position by the return spring means, so that the vehicle can be driven under the high response speed and safety conditions.

CONSTRUCTION OF FIRST THROTTLE VALVE CONTROLLER

Figure 1:
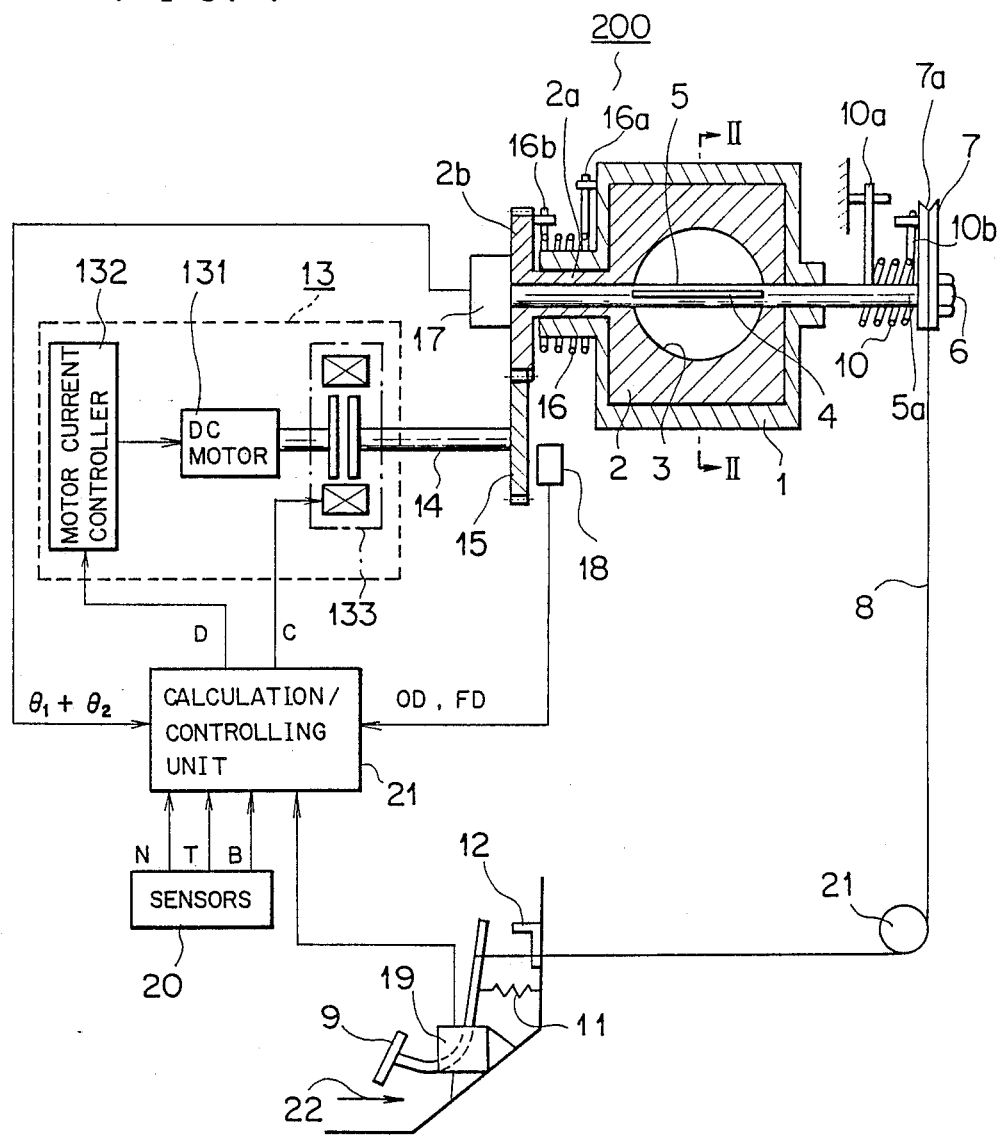
FIG. 1 schematically shows a throttle valve controlling apparatus 200 according to a first preferred embodiment of the invention.

Referring now to FIG. 1, a throttle valve controlling apparatus 200 accomplished based upon the first basic idea, according to a first preferred embodiment, will now be described.

The throttle valve controlling apparatus 200 and its peripheral arrangement are constructed by the following components.

Reference numeral 1 denotes an air-intake pipe of an engine of an automobile (not shown). A first throttle valve 2 has a cylindrical shaft portion 2a supported to the air-intake pipe 1 and is rotatably attached in the pipe 1. The first throttle valve 2 has also a cylindrical path 3 through which the sucked air to the engine passes. A second throttle valve 4 is coaxially employed with the first throttle valve 2 and constitutes a pair of throttle valves in conjunction with the first throttle valve 2. The second throttle valve 4 is a disk-like shape and opens and closes the cylindrical path 3 of the first throttle valve 2. A valve shaft 5 for the second throttle valve 4 is supported to the air-intake pipe 1 and penetrates through the cylindrical shaft portion 2a of the first throttle valve 2, and furthermore opens and closes the second throttle valve 4. An accelerating wire 8 is wound around a groove 7a of a segment-shaped disk 7 fixed to the valve shaft 5 by a bolt 6. The wire 8 is coupled with an accelerator pedal 9 through a pulley 21. A first coil-shaped return spring 10 is provided to apply tension to the wire 8. One end 10a of the return spring 10 is fixed to a portion of the air-intake pipe 1 and the other end 10b thereof is fixed to the disk 7. The second throttle valve 4 is biased to the closed position (which will be explained hereinlater) by the first return spring 10. A second return spring 11 and a stopper 12 for the accelerator pedal 9 are also provided.

An electrically controlled actuator 13 comprises a DC drive motor 131, a motor current controlling circuit 132 to supply a current to the DC motor 131, and an electromagnetic clutch 133. A rotary shaft 14 is coupled with a gear 15. The first throttle valve 2 is rotated in a predetermined direction by the drive motor 131 through the gear 15 meshed with a gear 2b coupled with the cylindrical shaft portion 2a of the first throttle valve 2 and through the rotary shaft 14. The electromagnetic clutch 133 is arranged between the rotary shaft 14 and the drive motor 131. When a power source (not shown in detail) for the clutch 133 is turned off, the rotational force of the drive motor 131 is not transferred to the rotary shaft 14. That is, the first throttle valve 2 is not rotated. Reference numeral 16 denotes a third coil-shaped return spring. One end 16a of the return spring 16 is fixed to the air-intake pipe 1 and the other end 16b thereof is fixed to the gear 2b. The first throttle valve 2 is biased to the closed position by the third return spring 16. A relative rotation angle sensor 17 is constructed of, e.g., a potentiometer and detects an actual relative rotation angle (i.e., an actual relative opening degree of the first and second throttle valves 2 and 4) from the rotation angles of the gear 2b and valve shaft 5. A rotation angle sensor 18 detects a rotation amount of the gear 15, namely, the first throttle valve 2. An accelerator sensor 19 detects an operation amount of the accelerating pedal 9. Sensors 20 detect the operating state of the engine (e.g., a rotational speed "N" and a gear change timing "T" of the automatic variable transmission) and the driving state of the vehicle (e.g., a braking operation "B"). A calculation and controlling unit 21 receives output signals of the relative rotation angle sensor 17, rotation angle sensor 18, acceleration sensor 19, and sensors 20, respectively and executes predetermined calculating processes corresponding to those input information. Then, the calculation/controlling unit 21 controls the drive motor 131 through the motor current controlling circuit 132 and also turning the electromagnetic clutch 133 ON or OFF.

OPERATIONS OF THROTTLE VALVES

Figure 2:
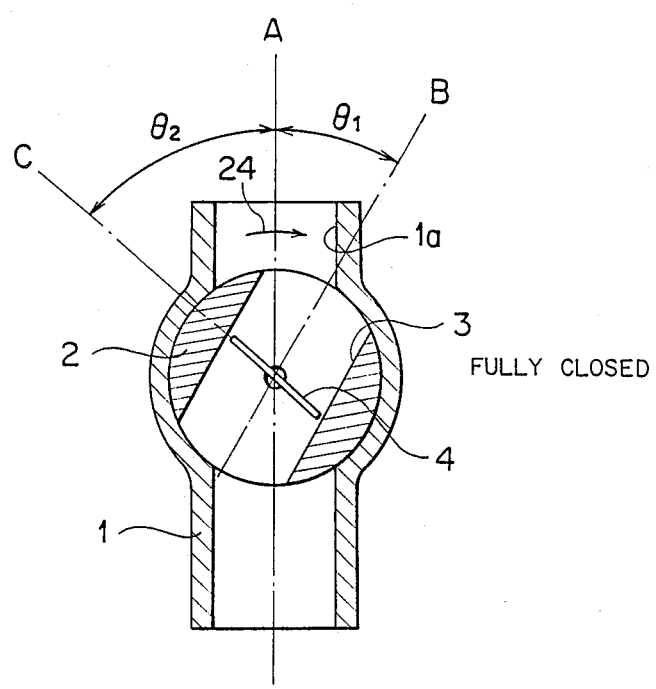
FIG. 2 schematically illustrates relative operations of the first and second throttle valves, shown in FIG. 1, under a full closed condition.
Figure 3:
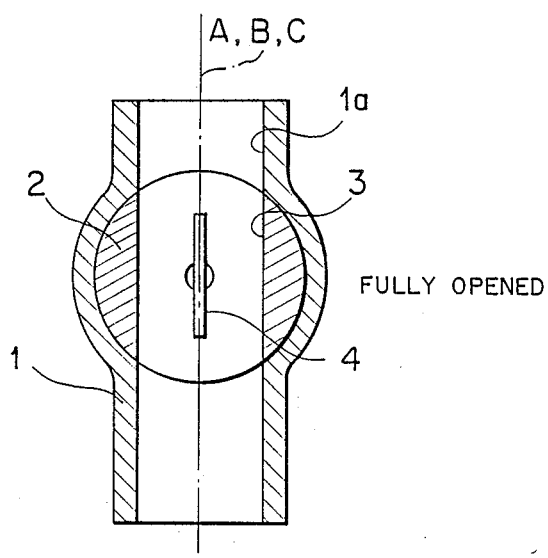
FIG. 3 schematically illustrates relative operations between the first and second throttle valves, shown in FIG. 1, under a full opened condition.

Referring to FIGS. 2 and 3, various operations of the first and second throttle valves 2 and 4 will now be described.

FIG. 2 is a cross-sectional view taken along the line II—II in FIG. 1 and, particularly, shows the throttle valve state in which the first and second throttle valves 2 and 4 are fully closed during the idling state of the engine (that is, the actual relative rotation angle $\theta_R = \theta_1 + \theta_2$). A center line "A" of an air-intake passage 1a of the air-intake pipe 1, a center line "B" of the cylindrical path 3, and a valve plane "C" of the second throttle valve 4 intersect with each other. FIG. 3 shows the throttle valve state in which the first and second throttle valves 2 and 4 are opened in the full opening mode of the engine (the actual relative rotation angle $\theta_R = 0°$). The center lines "A" and "B" and valve plane "C" are coincident with each other in a parallel form, thereby minimizing the passing resistance of the sucked air to the engine (that is, the state of the maximum engine speed).

OPERATION OF FIRST THROTTLE VALVE CONTROLLER

The operation will now be described. The rotational force of the drive motor 131 in the electrically controlled actuator 13 is transferred through the clutch 133 and the gear 15 to the cylindrical shaft portion 2a of the first throttle valve 2 against the spring biasing force of the third return spring 16. Thus, the first throttle valve 2 is rotated. On the other hand, the second throttle valve 4 is opened or closed through the accelerator wire 8, pulley 21, disk 7, and valve shaft 5 in accordance with the operating amount of the accelerator pedal 9. That is, as illustrated in FIG. 2, when the pedal 9 is depressed in the direction indicated by an arrow 22 shown in FIG. 1, the second throttle valve 4 rotates in the direction of an arrow 24 in FIG. 2, so that the rotation angle "$\theta_2$" becomes small. On the contrary, the first throttle valve 2 rotates in the direction opposite to the direction of the arrow 24, so that the rotation angle "$\theta_1$" similarly becomes small. Thus, the area of the air path in the cylindrical passage 3 changes in correspondence to the actual relative rotation angle $\theta_R(=\theta_1+\theta_2)$ between the first and second throttle valves 2 and 4. Accordingly, an amount of intake air can be controlled which is inhaled into the engine. As a consequence, the engine speed changes from the idle speed to the maximum speed. On the other hand, as shown in FIG. 3, when the rotation angles $\theta_1$ and $\theta_2$ becomes zero and the center line B and valve plane C are coincident with the center line A, the air passage area in the cylindrical path 3 becomes maximum and at the same time, the passing area from the intake air passage 1a to the cylindrical path 3 also becomes maximum. In other words, the engine speed becomes maximum under this condition. For the throttle valve driving section which operates in this manner, the calculation/controlling unit 21 calculates a target relative rotation angle "$\theta_T$" between the first and second throttle valves 2 and 4 from the various information of the rotation angle sensor 18, accelerating sensor 19, and sensors 20, and also outputs a rotation command signal "D" to the electrically controlled actuator 13. In response to this rotation command signal "D", the electrically controlled actuator 13 is controlled in such a manner that the deviation between the target relative rotation angle $\theta_T$ and the actual relative rotation angle $\theta_R(=\theta_1+\theta_2)$ obtained from the output signal of the relative rotation angle sensor 17 becomes zero. In other words, the first throttle valve 2 is controlled by the electrically controlled actuator 13 through a feedback path of the relative rotation angle sensor 17 and the calculation/controlling unit 21 in such a manner that the actual relative rotation angle "$\theta_R$" is equal to the target relative rotation angle "$\theta_T$". This signal "D" represents the contents of the rotating direction, energization (rotation), de-energization (stop), or the like corresponding to the operating modes of the drive motor 131.

On the other hand, when either the drive motor 131 or motor current controlling circuit 132 fails and an extraordinary condition is detected in the rotating operation of the gear 14, that is, the output signal of the rotation angle sensor 18 according to the output (the rotation command signal D) of the calculation/controlling unit 21. The calculation/controlling unit 21 immediately generates the control signal "C" to make the clutch 133 inoperative in response to the fail detection signal. Thus, the first throttle valve 2 is returned to the full closed position (the idle operating position in FIG. 2) by the biasing force of the third return spring 16. In other words, the vehicle speed is rapidly reduced. Thereafter, the actual relative rotation angle $\theta_R(=\theta_1+\theta_2)$ is controlled by only the second throttle valve 4 which is mechanically coupled and operated through the accelerator pedal 9 and wire 8. The driving of the vehicle can be continued. Even when the electrically controlled actuator 13 is brought into malfunction, the runaway of the vehicle can be prevented and simultaneously the driving of the vehicle can be maintained, which is so-called as "a limp home" driving condition.

The second throttle valve 4 was rotated by the accelerator pedal 9 in the foregoing first embodiment. However, the first throttle valve 2 may be rotated by the pedal 9, whereas the second throttle valve 4 may be rotated by the electrically-controlled actuator 13.

Also, in the above-described first preferred embodiment, the target relative rotation angle "$\theta_T$" was calculated in the calculation/controlling unit 21 based upon the various information derived from the sensors 20. Alternatively, this relative rotation angle may be determined based upon only the operation amount of the accelerator pedal 9.

As described above, according to the first throttle valve controller 200, there are provided the first throttle valve having the cylindrical path through which the intake air of the engine passes and the second throttle valve to open and close this cylindrical path, and both of the first and second throttle valves are rotatably coaxially held by the driving means. Therefore, the intake air can be promptly controlled for the rapid motion of the accelerator pedal and the passing resistance for the intake air in the full opening condition of the throttle valves can be reduced. Further, the driving of the vehicle can be maintained even if the electrically controlled actuator as the driving means becomes uncontrollable.

CONSTRUCTION OF SECOND THROTTLE VALVE CONTROLLER

A throttle valve controlling apparatus 400, according to a second preferred embodiment, realizes based on the second basic idea of the invention will now be described in detail with reference to FIGS. 4 to 6.

As mentioned above, according to the throttle valve controlling apparatus 400 of the second embodiment, such a throttle valve controlling apparatus of an engine can be also applied to an apparatus to suppress a gear change shock which is caused in the gear changing operation of an automatic variable transmission system.

Figure 4:
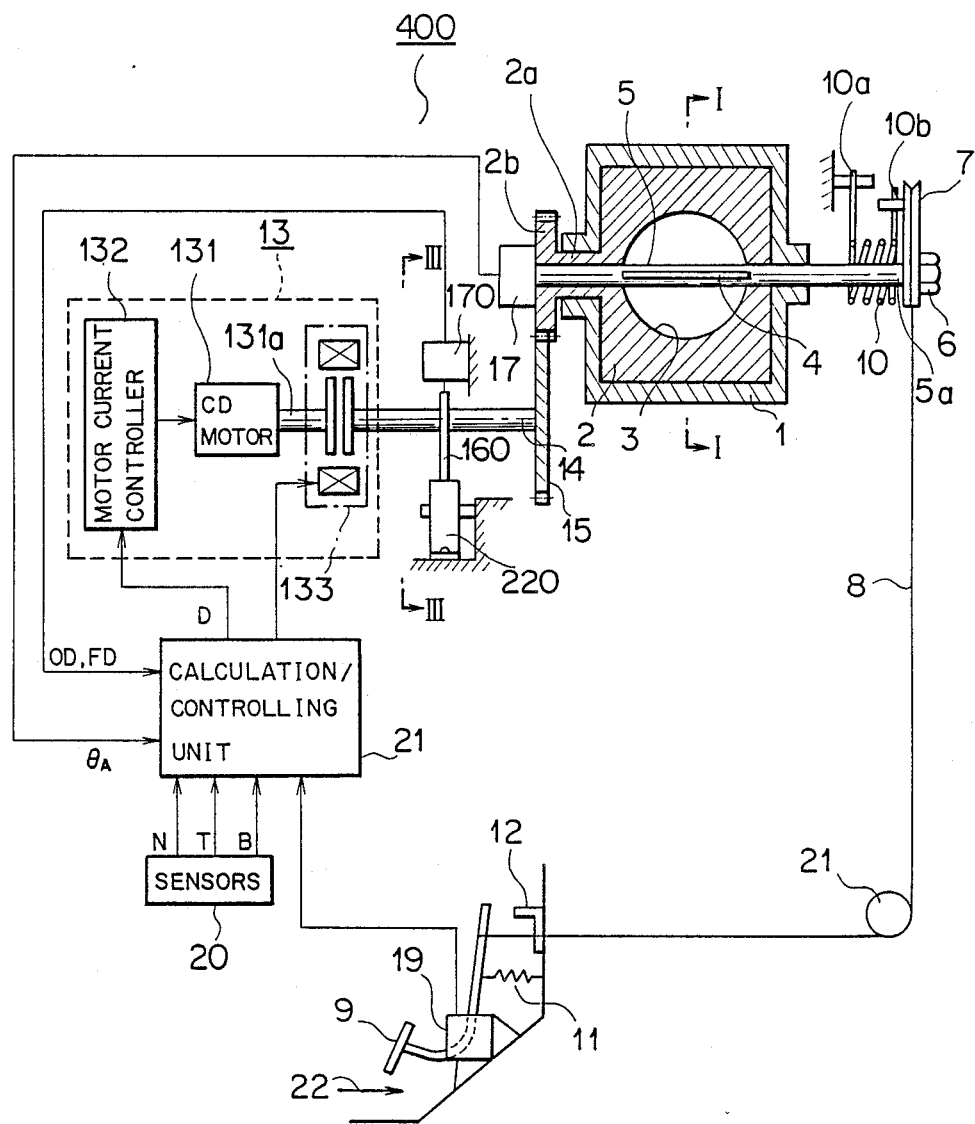
FIG. 4 schematically illustrates a throttle valve controlling apparatus 400 according to a second preferred embodiment of the invention.

FIG. 4 is a schematic diagram showing the throttle valve controlling apparatus 400 in the second embodiment of the invention. FIG. 5 is a cross sectional view taken along the line I—I in FIG. 4. FIG. 6 is a cross sectional view taken along the line III—III in FIG. 4.

The same or similar parts and components as those in the first embodiment shown in FIGS. 1 to 3 are designated by the same reference numerals.

Figure 5:
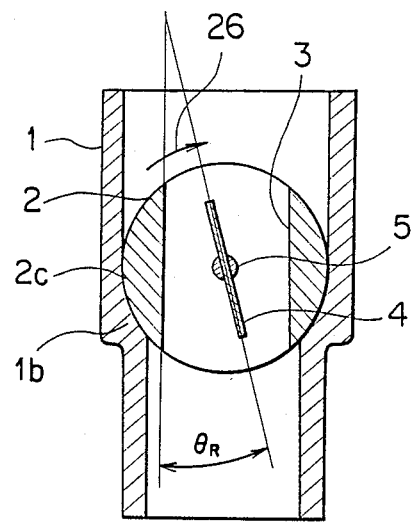
FIG. 5 schematically illustrates relative operations between the first and second throttle valves, shown in FIG. 4, under the condition between the engine idle speed and engine maximum speed.
Figure 6:
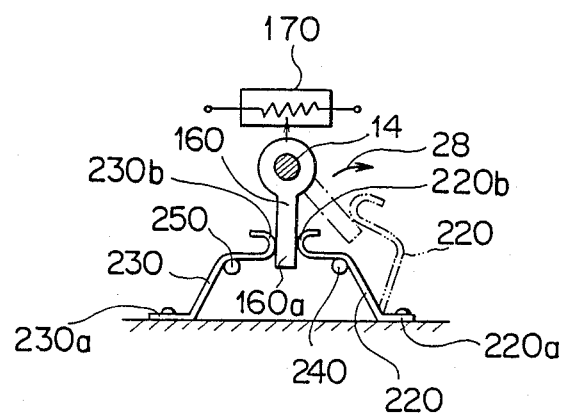
FIG. 6 is a schematic illustration for explaining functions of the third return spring means and the arm shown in FIG. 4.

In FIGS. 4 to 6, reference numeral 1 denotes the air-intake pipe of an engine (not shown) and 2 is the first throttle valve having the cylindrical shaft portion 2a axially supported to the air-intake pipe 1. The first throttle valve 2 is rotatably attached in the passage of the pipe 1 and has the cylindrical path 3 through which the intake air to the engine passes. The second throttle valve 4 is attached rotatably and coaxially with the first throttle valve 2 and constructs a pair of valves together therewith. The second throttle valve 4 opens and closes the cylindrical path 3. The valve shaft 5 is axially supported by the air-intake pipe 1 and passes through the cylindrical shaft portion 2a of the first throttle valve 2 and penetrates the first throttle valve 2. The valve shaft 5 holds the second throttle valve 4 and opens and closes it. The accelerator wire 8 is wound around the groove of the segment-shaped disk 7 fixed to one end portion 5a of the valve shaft 5 and coupled with the accelerator pedal 9 through the pulley 21. Reference numeral 10 denotes a coil-shaped return spring as the first return spring. The return spring 10 penetrates through the valve shaft 5 and one end 10a thereof is fixed to the outer wall of the air-intake pipe 1 and the other end 10b thereof is fixed to the side surface of the disk 7. The return spring 10 applies a torque to the disk 7 so as to return the second throttle valve 4 to the closed position (set position). The return spring 10 also applies tension to the wire 8. That is, when the throttle valve 4 is set to the closed position, the engine speed is reduced. Reference numeral 11 denotes the second return spring for the pedal 9. The stopper 12 is provided to stop the pedal 9 to the initial position. The gear 2b is formed on the extension line of the cylindrical shaft portion 2a of the first throttle valve 2. The gear 15 having the rotary shaft 14 is meshed with the gear 2b. The electrically controlled actuator 13 comprises the DC drive motor 131, motor current controlling circuit 132 to supply a current to the motor 131, and electromagnetic clutch 133 for allowing a motor shaft 131a of the drive motor 131 to be come into engagement with or disengagement from the rotary shaft 14. An arm 160 is attached to the rotary shaft 14. A rotation angle sensor 170 is coupled with the arm 160 and detects a rotation angle of the arm 160, i.e., a rotating amount of the first throttle valve 2. The relative rotation angle sensor 17 is attached to the side portion of the gear 2b and detects an actual relative rotation angle $\theta_A$ (an actual relative opening degree) between the first and second throttle valves 2 and 4 from the rotation angle of the gear 2b and the rotation angle of the valve shaft 5 inserted to the shaft core portion of the gear 2b. The sensor 17 is constructed of, e.g., a potentiometer. The accelerator sensor 19 detects an operating amount of the accelerator pedal 9 which is operated by the car driver. The sensors 20 detect the operating conditions of the engine (for example, the engine revolution speed "N" and gear change timing "T" of the automatic variable transmission) and the driving condition of the vehicle (e.g., the braking operation "B"). The calculation and controlling unit 21 receives the output signals of the rotation angle sensor 170, relative rotation angle sensor 17, acceleration sensor 19, and sensors 20 and executes predetermined calculating processes in correspondence to those input information. Then, the calculation/controlling unit 21 controls the drive motor 131 through the motor current controlling circuit 132 and makes the clutch 133 operative or inoperative. The calculation/controlling unit 21 has the function to calculate a target relative rotation angle "$\theta_T$" between the first and second throttle valves 2 and 4.

Third return springs 220 and 230 are provided to return the arm 160 attached to the rotary shaft 14 on the load side of the clutch 133 to a predetermined position. The function of the third return springs 220 and 230 will be explained hereinlater.

As will be readily understood from FIG. 5, the inner dimensions of the air-intake pipe 1 are determined such that a curvature of an inner wall surface 1b of the pipe 1 corresponding to the portion whose width changes from a wide width to a narrow width, is coincident with a curvature of a diameter in the cross section of the first throttle valve 2. The outer wall surface 2c of the first throttle valve 2 abuts on the inner wall surface 1b, thereby enabling the first throttle valve 2 to slide along the air-intake pipe 1.

The relative rotation angle "$\theta_A$" of the first and second throttle valves 2 and 4 is defined by the angle between the plane of the cylindrical path 3 of the first throttle valve 2 and the valve plane of the second throttle valve 4.

FUNCTION OF ARM RETURN SPRING

The third return spring means including the arm 160 to rotate the first throttle valve 2 will now be described with reference to FIG. 6. That is, the return springs 220 and 230 consisting of leaf springs are provided as the third return spring means under condition that they are symmetrically positioned with respect to the arm 160. One end 220a and one end 230a of the return springs 220 and 230 are fixed, and their free end portions 220b and 230b bias a lower end portion 160a of the arm 160 in the opposite directions. When the arm 160 rotates counterclockwise (in the direction of an arrow 28) viewed in FIG. 6, the arm 160 is deviated against the biasing force of the return spring 220 as shown by an alternate long and two short dashes line shown in FIG. 6. Conversely, when the arm 160 rotates clockwise, the arm 160 is likewise deviated against the biasing force of the other return spring 230. Both of the return springs 220 and 230 apply the almost equal torques to the arm 160 so as to return the arm 160 to its set position (the position indicated by a solid line shown in the diagram). Stoppers 240 and 250 are employed to position the return springs 220 and 230 in such a way that the biasing forces of the return springs 220 and 230 are not applied to the arm 160 when the arm 160 is positioned to the above-described set position by the biasing forces of the third return springs 220 and 230.

On the other hand, the potentiometer 170 as the rotation angle sensor to detect the rotation angle of the arm 160, in other words, the rotation angle of the first throttle valve 2 is mechanically coupled with the arm 160.

OPERATION OF SECOND THROTTLE VALVE CONTROLLER

The operation of the throttle valve controlling apparatus 400 according to the second embodiment will now be described with reference to FIGS. 4 to 6.

The rotational force of the DC motor 131 in the electrically controlled actuator 13 is transferred through the electromagnetic clutch 133 in the operative mode, and is propagated from the gear 2b of the first throttle valve 2 to the cylindrical shaft portion 2a through the gear 15 against the biasing force of the third return spring 220 or 230, thereby rotating the first throttle valve 2. On the other hand, the force corresponding to the depressing amount of the accelerator pedal 9 is transferred to the second throttle valve 4 through the accelerator wire 8, pulley 21, disk 7, and valve shaft 5, in order to open or close the second throttle valve 4. In the closing operation of the second throttle valve 4, the recovering force of the first return spring 10 acts on the valve shaft 5 from the disk 7. When the actual relative rotation angle $\theta_A$ between the first and second throttle valves 2 and 4, shown in FIG. 5 (for example, $\theta_A = 90°$ in the full closed mode, $\theta_A = 0°$ in the full open mode), increases, the intake air passage in the cylindrical path 3 is narrowed by the second throttle valve 4, thereby reducing the intake air which is inhaled into the engine, that is, the decelerating drive is performed.

For the driving section which operates as mentioned above, the calculation/controlling unit 21 calculates the target relative rotation angle $\theta_T$ of the throttle valves from the various input information of the rotation angle sensor 170, acceleration sensor 19, and sensors 20, and outputs the rotation command signal "D" to the electrically controlled actuator 13 so that the deviation between the calculated target relative rotation angle $\theta_T$ and the actual relative rotation angle $\theta_A$ which is derived from the output signal of the relative rotation angle sensor 17 becomes zero. That is, the first throttle valve 2 is rotated under control of the electrically controlled actuator 13 in such a manner that the deviation between $\theta_A$ and $\theta_T$ is equal to zero. The rotation command signal "D" consists of the contents of the rotating direction, energization (rotation), de-energization (stop), or the like in accordance with the operating mode of the drive motor 131. Thus, the DC motor 131 is driven by a current which is generated from the motor current controlling circuit 132 according to the rotation command signal "D", thereby controlling the rotating position of the first throttle valve 2.

On the other hand, when the DC motor 131 or motor current controlling circuit 132 fails and then the rotation angle sensor 170 detects an extraordinary condition in the rotating operation of the gear 15 responsive to the output (the rotation command signal "D") of the calculation/controlling unit 21 and outputs a fail detection signal "$F_D$", the calculation/controlling unit 21 determines the occurrence of the abnormality in response to the fail detection signal $F_D$ and immediately turns off the clutch 133. As a result, the biasing force of the third return spring 220 or 230 acts on the arm 160 as the recovering force, thereby rotating the arm 160 in its biasing direction and returning it to the set position. The first throttle valve 2 is returned to the set position by the recovering operation of the arm 160 through the rotary shaft 14, gear 15, and gear 2b. Thus, the engine speed is rapidly reduced, so that the runaway of the vehicle can be avoided. Thereafter, the actual relative rotation angle $\theta_A$ can be controlled by only the second throttle valve 4 which is mechanically coupled with and operated by accelerator pedal 9. Consequently, driving of the vehicle can be driven in a so-called limp home, even in such a malfunction condition of the electrically controlled actuator 13.

In addition to the above-described malfunction mode, the throttle valve controlling apparatus 400 according to the second embodiment has the following function.

When a signal of the gear change timing "T" of the automatic variable transmission system is input from the sensors 20 to the calculation/controlling unit 21, the actuator 13 operates in accordance with the control of the calculation/controlling unit 21. The drive motor 131 is driven to rotate the first throttle valve 2 through the gears 15 and 2b in such a direction as to increase the actual relative rotation angle $\theta_A$ in the direction of the arrow 26 in FIG. 5. That is, the decelerating operation of the engine is performed. The air intake passage in the cylindrical path 3 is narrowed by controlling the actual relative rotation angle $\theta_A$ between the first and second throttle valves 2 and 4 by the throttle valve controlling apparatus 400 (i.e., the electrically controlled actuator 13) so as to be set to a predetermined value. In this way, an amount of intake air which is inhaled to the engine, can be limited. After completion of the gear changing operation of the automatic variable transmission system, the DC motor 131 is driven in the direction opposite to the driving direction during the foregoing decelerating operation, so that the first throttle valve 2 is returned to the valve position where the gear changing operation is not yet performed. The well-known operation to prevent a shock in the gear changing operation is executed by temporarily closing the intake air passage at the time of the gear changing operation in the throttle valve controlling apparatus 400.

As described above, the throttle valve controlling apparatus 400 of the second embodiment has the following two functions. As the first function, this apparatus is characterized in that in a manner similar to the throttle valve controlling apparatus 200 in the first embodiment, when the electrically controlled actuator 13 fails, the runaway of the vehicle can be prevented and the vehicle can be continuously driven. As the second function, the apparatus is characterized in that in the temporary decelerating operation of the engine in the case of the traction control or the like, the decelerating operation of the engine can be executed by making the electrically controlled actuator 13 operative without operating the accelerator pedal 9.

Although the first throttle valve 2 has been controlled by the electrically controlled actuator 13 in the foregoing second embodiment, the second throttle valve 4 may be also controlled in place of the first throttle valve 2. In this case, the first throttle valve 2 is controlled by the accelerator pedal 9. That is, it is sufficient to control either one of the first and second control valves 2 and 4 by the electrically controlled actuator 13.

As described above, in the throttle valve controlling apparatus according to the second embodiment, the quantity of intake air to the engine is controlled by the actual relative rotation angle between the first and second throttle valves. When the electrically controlled actuator fails, either one of the first and second throttle valves is returned to the set position by the third return spring means. Therefore, when the electrically controlled actuator fails, the other one of the first and second throttle valves is driven, so that the driving of the vehicle can be maintained. Further, since the electrically controlled actuator drives the first or second throttle valve independently of the operation of the accelerator pedal, the control to reduce the quantity of intake air to the engine can be easily realized and there is an advantage such that it is possible to obtain the throttle valve controlling apparatus having higher safety and higher response speed characteristics.

What is claimed is:

1. A throttle valve controlling apparatus for an automobile comprising:

throttle valve means including a first throttle valve and a second throttle valve relatively rotatable to said first throttle valve, for controlling a flow of an air/fuel mixture to an engine;

rotating means mechanically coupled to an accelerator pedal, for relatively rotating said first throttle valve with respect to said second throttle valve;

first return spring means for biasing said first throttle valve so as to set the same to a first closed position of said throttle valve means when said accelerator pedal is released;

relative rotation angle sensor means for detecting an actual relative rotation angle between said first and second throttle valves to output an actual relative rotation angle signal;

calculation controlling means for producing a rotation command signal representative of a target relative rotation angle for said first and second throttle valves, determined by operation of said accelerator pedal;

electrically controlled actuator means for relatively rotating said second throttle valve with respect to said first throttle valve in response to said rotation command signal derived from said calculation controlling means in such a manner that deviation between said target relative rotation angle and actual relative rotation angle becomes zero;

rotation angle sensor means coupled to said second throttle valve, for detecting a rotation angle of said second throttle valve to output a rotation angle signal to said calculation controlling means; and, second return spring means for biasing said second throttle valve so as to set the same to a second closed position of said throttle valve means, whereby when said electrically controlled actuator means is brought into malfunction by checking said rotation angle signal from said rotation angle means, said second throttle valve is set to said second closed position at which engine speed is rapidly reduced, and said first throttle valve is independently rotatable by said accelerator pedal.

2. A throttle valve controlling apparatus as claimed in claim 1, wherein said electrically controlled actuator means includes:

a DC (direct current) motor;

an electromagnetic clutch for intermittently transferring motor force of said DC motor to said second throttle valve; and a motor current controlling circuit for controlling motor current of said DC motor in response to said rotation command signal.

3. A throttle valve controlling apparatus as claimed in claim 1, wherein said second throttle valve is rotatably stored within an air-intake tube of the engine and has a cylindrical path formed therein for passing the air/fuel mixture to the engine, and said first throttle valve is a disk shape and coaxially provided within said cylindrical path of said second throttle valve so as to control a flow quantity of said air/fuel mixture in conjunction with said second throttle valve.

4. A throttle valve controlling apparatus as claimed in claim 3, wherein said second throttle valve further includes a cylindrical axial part supported by said air-intake tube and coupled to a first gear, and said second return spring means is a coil-shaped spring one end of which is fixed on said air-intake tube and the other end of which is fixed on said first gear, said first gear being coupled to said electromagnetic clutch via a second gear.

5. A throttle valve controlling apparatus as claimed in claim 1, further comprising:
engine condition/drive condition sensor means for outputting an engine condition detecting signal and a drive condition detecting signal to said calculation controlling means so as to determine said target relative rotation angle based upon said engine condition detecting signal and said drive condition detecting signal in addition to said operation of the accelerator pedal.

6. A throttle valve controlling apparatus for an automobile comprising:
throttle valve means including a first throttle valve and a second throttle valve relatively rotatable to said first throttle valve, for controlling a flow of an air/fuel mixture to an engine;
rotating means mechanically coupled to an accelerator pedal, for relatively rotating said first throttle valve with respect to said second throttle valve;
first return spring means for biasing said first throttle valve so as to set the same to a first closed position of said throttle valve means when said accelerator pedal is released;
relative rotation angle sensor means for detecting an actual relative rotation angle between said first and second throttle valves to output an actual relative rotation angle signal;
rotation angle sensor means coupled to said second throttle valve, for detecting a rotation angle of said second throttle valve to produce a rotation angle signal;
engine condition/drive condition sensor means for detecting conditions of the engine and also the automobile's drive to produce an engine condition detecting signal and a drive condition detecting signal;
calculation controlling means for producing a rotation command signal representative of a target relative rotation angle for said first and second throttle valves, determined by said engine condition detecting signal and said drive condition detecting signal and also operation of the accelerator pedal;
electrically controlled actuator means for relatively rotating said second throttle valve with respect to said first throttle valve in response to said rotation command signal derived from said calculation controlling means in such a manner that deviation between said target relative rotation angle and actual relative rotation angle becomes zero, and for relatively rotating said second throttle valve with respect to said first throttle valve in response to said engine condition detecting signal and drive condition detecting signal so as to reduce said actual relative rotation angle by which engine speed is reduced; and,
second return spring means for biasing said second throttle valve so as to set the same to a second closed position of said throttle valve means, whereby when said electrically controlled actuator means is brought into malfunction by checking said rotation angle signal from said rotation angle sensor means, said second throttle valve is set to said second closed position at which the engine speed is rapidly reduced, and said first throttle valve is independently rotatable by said accelerator pedal.

7. A throttle valve controlling apparatus as claimed in claim 6, wherein said electrically controlled actuator means includes:
a DC (direct current) motor;
an electromagnetic clutch having a first clutch shaft and a second clutch shaft, for intermittently transferring motor force of said DC motor to said second throttle valve via said first and second clutch shaft; and,
a motor current controlling circuit for controlling motor current of said DC motor in response to said rotation command signal.

8. A throttle valve controlling apparatus as claimed in claim 7, wherein an arm is provided one end of which is fixed on said second clutch shaft and the other end of which is a free end; said second return spring means is constructed of a pair of first and second leaf springs, one end of each first and second leaf springs being fixed on the engine, and the other end thereof biasing said free end of the arm in such a manner that said arm is positioned to a neutral position where no spring force of said first and second leaf springs is exerted on said free end of the arm.

9. A throttle valve controlling apparatus as claimed in claim 6, wherein said second throttle valve is rotatably stored within an air-intake tube of the engine and has a cylindrical path formed therein for passing the air/fuel mixture to the engine, and said first throttle valve is a disk shape and coaxially provided within said cylindrical path of said second throttle valve so as to control a flow quantity of said air/fuel mixture in conjunction with said second throttle valve.

* * * * *